Jan. 1, 1935.  H. BOETTCHER  1,986,552

PREFORMED BUILDING SLAB

Filed June 8, 1932

Patented Jan. 1, 1935

1,986,552

UNITED STATES PATENT OFFICE 1,986,552

PREFORMED BUILDING SLAB

Henry Boettcher, Lancaster, Pa., assignor to United States Euboeolith Company, Lancaster, Pa., a corporation of Delaware Application June 8, 1932, Serial No. 615,957

5 Claims. (Cl. 72—68)

This invention relates to a new and useful improvement in preformed building slabs and more particularly to preformed building slabs which have insulating qualities and are of sufficiently light weight to be used for roof, wall and floor members in much the same manner as lumber.

One of the objects of my invention is to provide a relatively light-weight building slab which may be used in "plank" form to form roof, wall or floor surfaces or to be used as partitions. Another object of my invention is to provide a preformed building slab which is strong, light, fireproof and capable of receiving and holding nails. A further object of my invention is to provide a preformed building slab having a reenforcing therein but being of light weight and having the character of surface adapted for use directly as an exposed interior surface or for the reception of a flooring such as linoleum, tile, cork, magnesite compositions and the like. Other objects of my invention will be apparent from the following specification.

The building slabs available at the present time largely consist of Portland cement mixtures of one sort or another which are open to several objections. The objectionable weight of Portland cement compositions renders such slabs unsuited for use in light buildings and for purposes which do not require great mass, such for example as partitions and roof structures. Moreover, Portland cement compositions are not oil resisting and such uses as machine shop floors and the like where oil may come in contact with the floor are practically closed to the present slabs. An even more fundamental objection to the present slabs is the fact that they are not capable of readily receiving and holding nails, being of more or less friable nature.

My improved slab is suited for many uses for which the present building slabs are not adapted and my improved building slab can be used for any of the uses to which the present building slabs are put. My preformed slab may be used for walls, floors or ceilings. It is adapted to be used as partitioning for interiors or it may be used as a siding to which clapboarding may be nailed directly. It may also be used for siding with a covering of cement stucco, in which case the slab will preferably be given a waterproofing and bonding coat. The present invention will be better understood by reference to the accompanying drawing illustrating certain preferred embodiments of my invention in which:

Figure 1:
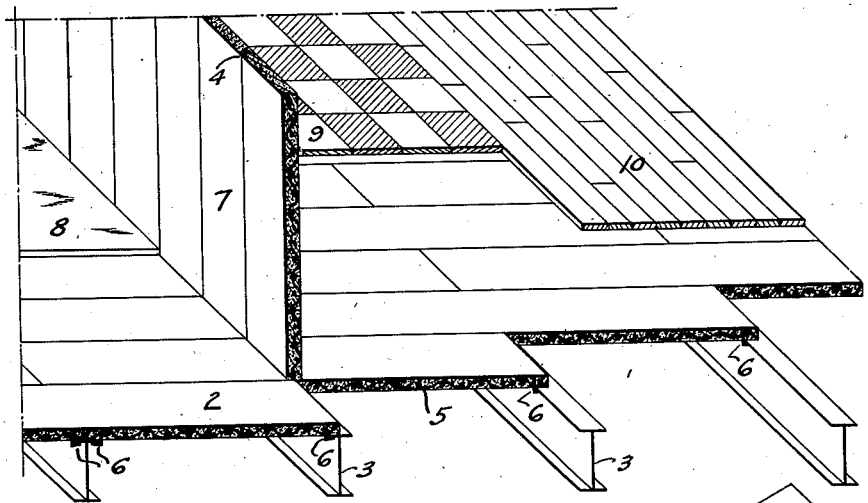
Figure 1 is a perspective view of a structure including slabs made according to my invention.

Referring to Figure 1 there is shown a structure comprising a plurality of slabs 2 supported by beams 3. The slabs 2 are preformed and comprise a body portion including a magnesium oxychloride binder and a light filler. I prefer to use about 4 parts by weight of Grecian fine ground magnesite with about 3 parts by weight of a 20° Bé. solution of magnesium chloride as a binder. To this binder is added an amount of filler such as sawdust or cork dust in an amount of 2 to 6 parts of the woody filler by volume into 1 part of the magnesite binder by volume. I usually prefer to mix the magnesium chloride solution into the dry ingredients.

I cast the slabs in a suitable form, either by hand or by machinery, tamp thoroughly and permit them to set. As will be noted the edge portions 4 (Figure 1) are provided with complementary engaging means which serve to position the slabs in line with each other. Because of the nail receiving qualities of my slab, adjacent slabs may be toe-nailed together resulting in a very strong partition or floor. Within the body of the slab I enclose a reenforcing 5 which may be a coarse wire screen or expanded metal. I prefer to place this reenforcing closer to one side than to the other to enable the metal to take up the tensile stresses. Satisfactory results will be obtained when the reenforcing lies on a plane about three-fourths of the distance through the slab in the direction of its thickness. The reenforcing 5 may be galvanized or otherwise treated to make it corrosion resisting.

As shown in Figure 1, the slab is secured to the beams 3 by means of fasteners 6 which are hook-like pieces driven into the slab. These are driven in like nails and expeditiously and securely fasten the slabs in place. It is an important advantage of my improved slab that it is capable of receiving and holding nails, screws and like fastening means without requiring receiving holes to be drilled in the slabs. Moreover, my slab is easily sawn, particularly when greater amounts of the woody filler are present.

Figure 2:
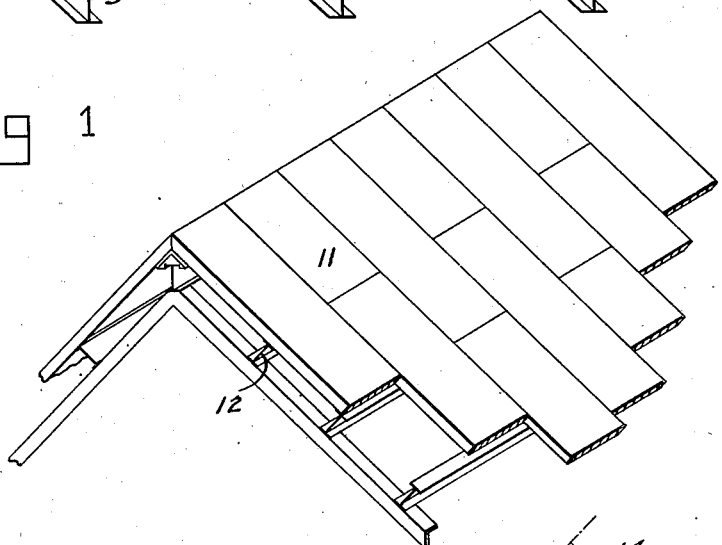
Figure 2 is a portion of a roof structure built up of my improved slabs.
Figure 5:
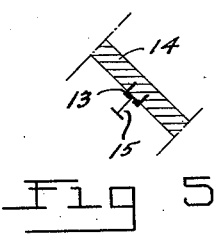
Figure 5 is a detail view showing the manner of securing the roof slabs illustrated in Figure 2.

Figure 1 shows a number of types of floors which may be laid on my improved slab which, in this case, forms a sub-floor. On one side of the partition 7 there is shown a linoleum floor 8 cemented directly to the slab flooring. My slab is particularly well suited for use as a sub-flooring for linoleum because the slabs may be sanded with an ordinary sanding machine to a smooth even surface which readily bonds with the ordinary linoleum cements. On the other side of the partition 7 there is shown a cork tile passageway 9 and a wooden flooring 10 for accommodation of machinery. In Figure 2 there is shown a roof construction embodying slabs 11 made according to my invention. These slabs are supported on the conventional I beams 12 and are secured thereto as shown in Figure 5, wherein nail-like hooks 13 are driven directly into the slab 14 with their heads arranged to overlie and grasp the flanges of a supporting beam 15. Because of the inclusion of the woody filler in such high proportions, I obtain a desirable insulating effect which reduces the transmission of heat through the slab, materially lessens the weight, renders the slab nailable, and makes it generally useful in places where ordinary building slabs cannot be used because they lack the qualities required by the service. For example, my slabs may be nailed to joists to form the ceiling of a room that it is desired to fireproof. They are readily adapted for this purpose because of their lightness, insulating effect and ready application by means of nails.

Figure 3:
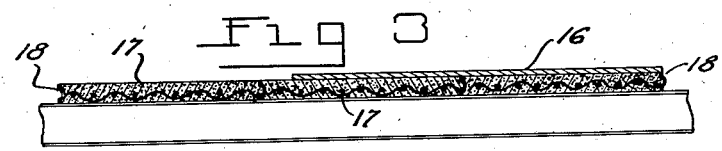
Figure 3 is a cross section showing a floor embodying my slabs.

Figure 3 shows a flooring 16 of magnesium oxychloride applied to slabs 17 made according to my invention. The edge portions of the slabs 17 are provided with complementary engaging means 18 whereby the adjacent slabs are interlockingly positioned. The magnesium oxychloride flooring 16 is applied directly to the slab and bonds thereto.

If desired, the slabs 17 may be used as the exposed floor surface. The surface of my improved slab is particularly attractive when various pigments are employed either mono-colored or in combination to give a striated effect. In such cases the top of the slab floor is merely ground and waxed and polished, resulting in a lightweight, inexpensive and attractive flooring.

Figure 4:
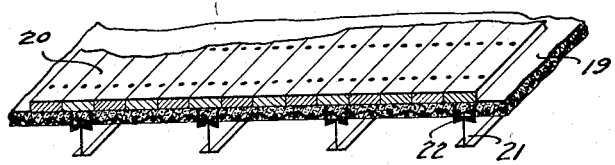
Figure 4 is a perspective sectional view showing a different type of floor embodying my slabs.

In Figure 4 I have shown a floor construction in which slabs 19 made according to my invention support a wood flooring 20 which is nailed directly to the slabs 19. The slabs 19 are fastened to supporting beams 21 by means of nails 22 driven directly into the slabs and engaging the flanges of the supporting beams 21. In this construction, the slabs are handled in much the same way as ordinary lumber, the joints between slabs being at right angles or at 45° to the supporting beams and being nailed directly thereto, and the top flooring being nailed directly to the sub-flooring. Where a construction as shown in Figure 3 is employed the whole construction is fireproof. This also applies to the roof construction illustrated in Figure 2.

My improved preformed slab may be used as a structural under-floor or may be used as a top floor over wood, concrete or steel supports. They may be used as sheathing on wood or steel studding and their ability to receive and hold nails renders them highly desirable for such use. When used as under flooring, the top floor may be nailed directly to them. If desired, they may be used for under floors for wood floors laid over sleepers as the sleepers can be nailed directly to the slab. When used in roof construction, they readily receive roofing nails for fastening slate, tile, asbestos or wooden shingles or the like and the slabs of course may be supported on steel or concrete beams where fireproof construction is desired.

My slab using Grecian magnesite and 6 parts by volume of sawdust or wood flour to one part of magnesite and magnesium chloride solution as specified above has a density of about fifty-four pounds per cubic foot including an expanded metal reenforcing within the slab. This is about one-third the weight of concrete and the ready workability of my slab and its capability of receiving and holding fastening means driven into it render it far superior to building units formed of Portland cement and mineral fillers.

California magnesite is not recommended because of its lower strength although there may be installations, such for example as slab flooring laid directly on concrete, in which the highest strength of slab need not be used and I do not desire to limit myself to the use of Grecian magnesite. It will be understood of course that the uses to which the slab is put will determine in some measure the quality of binder required, but in every case where the slab is to be nailable and of light weight, I specify that the slab contain a woody filler such as cork dust, sawdust, wood flour and the like. Other strengthening ingredients such as asbestos fiber may be used if desired without departing from the spirit of the invention and Sorel cements made of calcined dolomite may be employed.

The solution of magnesium chloride employed may vary somewhat but with the Grecian magnesite I prefer about a 20° Bé. magnesium chloride solution.

I have also made a highly desirable slab by incorporating kieselguhr in the slab. An excellent slab is made by using one-half part by volume of a magnesium oxychloride binder, one-half part by volume of kieselguhr and six parts by volume of sawdust. This slab is lighter than the slab previously described and is just as strong for ordinary purposes. It therefore offers some advantage in constructions where lightness and strength are important factors. It is interesting to note that a proportion of one part by volume of magnesium oxychloride binder and nine parts by volume of sawdust does not form a satisfactory slab. It appears, therefore, that the kieselguhr acts in some respect to aid in the bond.

The specific form of the preformed slab may be varied to meet the purpose for which it is intended. For some uses it may be desirable to omit the complementary engaging means along the edges. In other cases it may be desirable to have complementary engaging means along all sides. The geometric shape of the slab may be made to conform with structural members or formed with engaging means on the face of the slab for retaining covering pieces or for securement of the slab to structural surfaces.

While I have illustrated and described a preferred embodiment of my invention, it will be understood, however, that it is not limited to the forms shown, but may be otherwise embodied within the scope of the following claims.

I claim:

1. A fireproof and insulating flooring or roofing construction comprising a plurality of preformed reenforced, load-sustaining slabs, said slabs including a magnesium oxychloride binder, kieselguhr and a filler bonded thereby, and being provided with complementary engaging means along opposite edges thereof whereby adjacent slabs interengage to form a substantially continuous surface; means supporting said slabs; fastening means driven into said slabs and effective for securing the same to the supporting means; and a covering extending over the surface formed by the faces of the slabs and secured thereto.

2. A fireproof and insulating flooring or roofing construction comprising a plurality of precast, load-sustaining slabs, said slabs including a reenforcing and a filler bonded by a magnesium oxychloride and kieselguhr binder and being provided with complementary interlocking engaging means on opposite sides thereof whereby adjacent slabs interengage to form a substantially continuous surface; spaced supporting means; fastening means driven into said slabs and effective for securing said slabs to the supporting means; and a decorative covering material extending over the surface of said slabs and secured thereto.

3. A fireproof and insulating flooring or roofing construction comprising a plurality of reenforced, load-sustaining slabs, said slabs comprising a magnesium oxychloride binder, a metallic reenforcing extending throughout said slab and sufficient woody filler to bring the average density of the reenforced slab to substantially less than 54 pounds per cubic foot; complementary engaging means interlocking the longitudinal edges of adjacent slabs; means supporting said slabs at intervals greater than the width of said slabs and nail-like fastening means driven directly into said slabs and securing said slabs to said supporting means.

4. A light-weight, fireproof and insulating flooring or roofing construction comprising a plurality of reenforced load-sustaining slabs having width substantially greater than their thickness, said slabs comprising a magnesium oxychloride binder, a metallic reenforcing extending throughout said slab and sufficient woody filler to bring the average density of the reenforced slab to substantially less than 54 pounds per cubic foot; complementary engaging means interlocking the longitudinal edges of adjacent slabs; means supporting said slabs at intervals greater than the width of said slabs; nail-like fastening means driven directly into said slabs and securing said slabs to said supporting means and a wear-resisting covering supported by said slabs.

5. A fireproof and insulating flooring or roofing construction comprising a plurality of reenforced, load-sustaining slabs, said slabs comprising a magnesium oxychloride binder, metallic reenforcing extending substantially throughout said slab and sufficient woody filler to bring the average density of the reenforced slab to substantially less than 54 pounds per cubic foot; means supporting said slabs at intervals greater than the width of said slabs and fastening means driven directly into said slabs and securing said slabs to said supporting means.

HENRY BOETTCHER.